Aug. 22, 1961  K. SCHLESINGER  2,997,621
IMAGE DISPLAY DEVICE
Filed April 4, 1956  3 Sheets-Sheet 1

INVENTOR.
Kurt Schlesinger,
BY Mueller & Aichele
Attys.

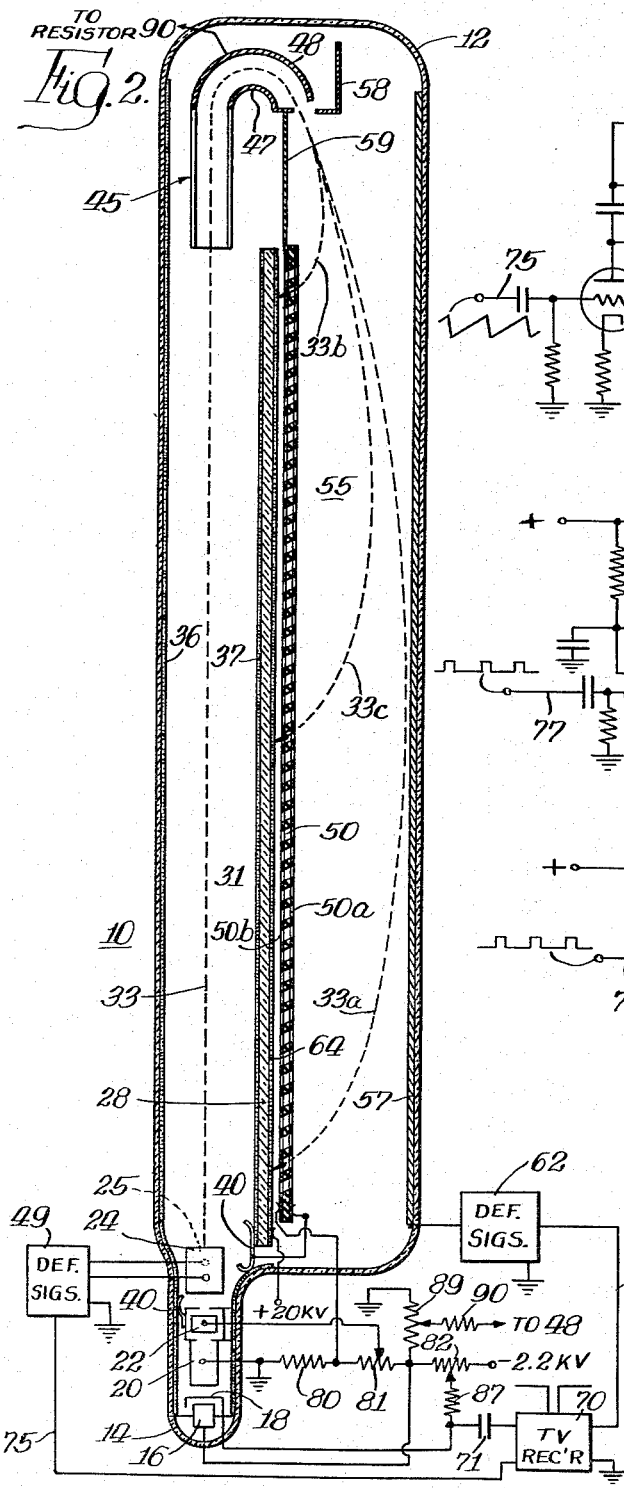

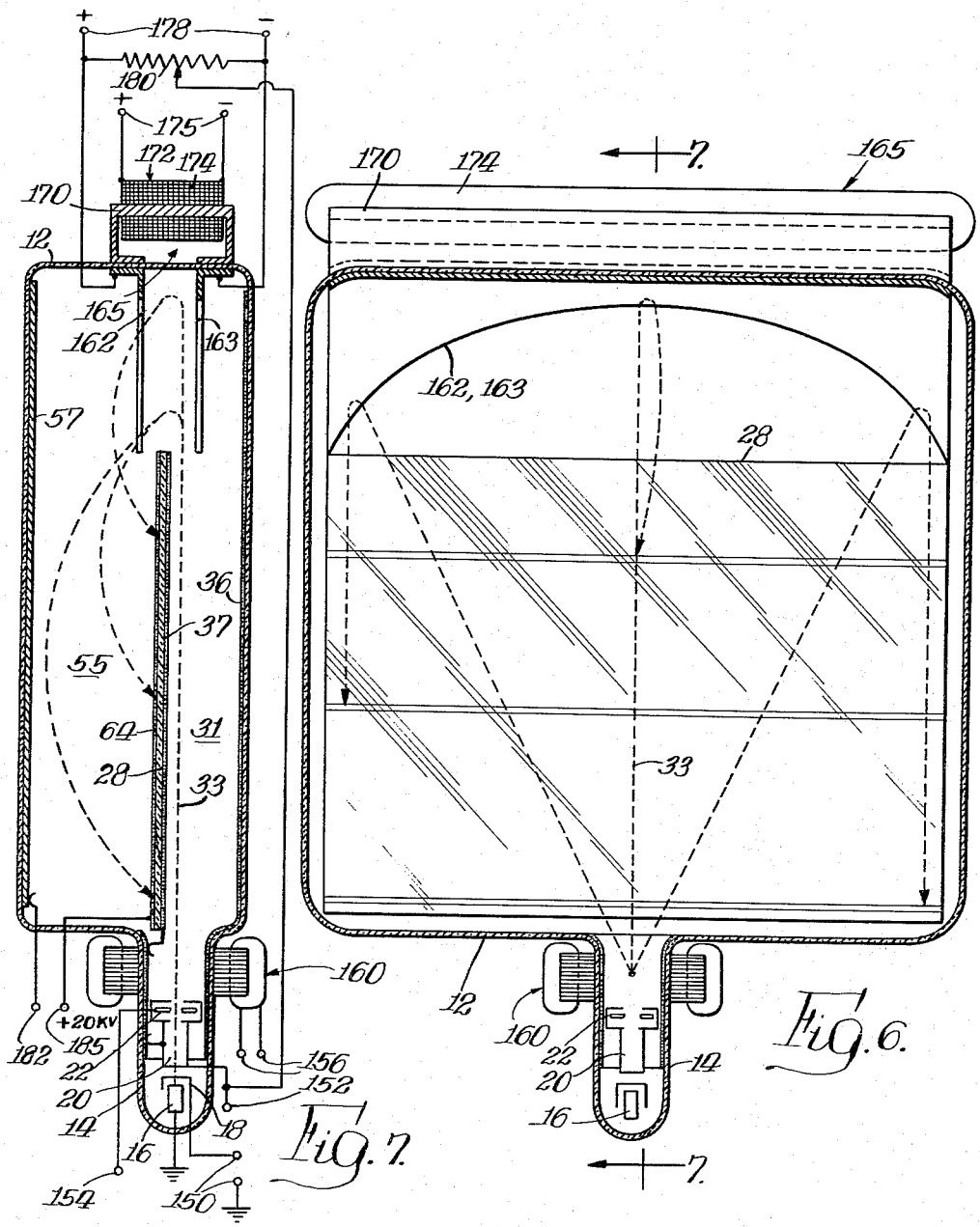

2,997,621
IMAGE DISPLAY DEVICE
Kurt Schlesinger, La Grange, Ill., assignor to Motorola, Inc., Chicago, Ill., a corporation of Illinois
Filed Apr. 4, 1956, Ser. No. 576,204
7 Claims. (Cl. 315—23)

This invention relates to cathode-ray image display tubes of the type useful in television receivers, radar equipment and the like, and more particularly to such a tube which is constructed as a "flat" structure.

In the more common present day cathode-ray image display tubes, the electron beam originates from a source at one end of the tube and is rapidly swept or scanned across a phosphor viewing screen generally perpendicular to the path of the beam at the other end of the tube to form an image on this screen. Since the ability to deflect under wide angles is limited, with this type of tube structure and in order to provide a screen of large size, it has been necessary to space the beam source at a considerable distance from the screen, thus requiring a long tube. In most cases the rather great tube length determines the minimum depth of the cabinet which houses the electronic apparatus used in connection with the tube and such long tubes make it necessary to use cabinets objectionably deep.

Although wide angle deflection has been used to cut down tube length, this requires greatly increased deflection power and sweep currents which are difficult to produce, and even then such tubes still do not permit reductions in depth to the extent desired. Furthermore, prior attempts to develop a cathode-ray tube having a different arrangement of elements to overcome objections to undue tube length and the inconvenient shape thereof have not been altogether satisfactory due to requirements of unconventional, complex deflection systems and/or complicated electron optical systems for bending the beam.

Accordingly, it is an object of the present invention to provide a relatively flat electron image display tube of uniform and shallow depth.

Another object is to provide a cathode-ray tube of simple construction which requires only common, easily formed deflection signals to form an image display.

Still another object of the invention is to provide a flat electron image display device having a large screen area and producing images of high brightness level and good definition.

A feature of the invention is the provision of an electron image display device wherein an electron beam source is disposed adjacent one edge of a viewing screen and directs an electron beam in spaced relation along one side of the screen into an electron mirror positioned adjacent an edge of the screen opposite the beam source, so that the beam is directed on the other side of the screen by the electron mirror and is caused to impinge the screen by action of a repeller electrode disposed at the rear of the screen. The beam may be deflected adjacent its source to strike the electron mirror at different points, and the mirror may be shaped so as to direct the beam along parallel paths on the other side of the screen when the beam is deflected so that rectilinear scanning across the screen is obtained.

Another feature of the invention is the provision of an electron image display device in accordance with the preceding paragraph wherein a beam is folded around the screen and high frequency deflection signals are applied to deflecting means at the source of electrons to cause the beam to scan the various positions of the electron mirror and low frequency deflection signals are applied to the repeller electrode, so that the beam swings rapidly from one edge of the mirror to the other while it is caused to impinge the screen at a given horizontal position by the repeller electrode, with the repeller voltage varying slowly to space the lines produced by the high frequency deflection at the beam source.

A further feature of the invention is the provision of an improved cathode-ray tube having a phosphor screen disposed in spaced relation from a repeller electrode and electron beam supplying apparatus arranged to direct a beam from different positions along the edges of the screen and repeller electrode and therebetween so that the beam may be directed on the screen at various scanned positions by application of deflection signals to the repeller electrode. The beam is directed into the space between the screen and the repeller electrode at an acute angle with respect to the repeller electrode and the action of the repeller electrode causes the beam to strike the screen at the same angle for the various positions on the screen. The spacing between the screen and the repeller electrode may be small and this spacing essentially determines the depth or thickness of the tube.

Still another feature is the provision of such a cathode-ray tube wherein an apertured shield electrode or mask is disposed between the screen and repeller electrode so that the beam may be directed toward the mask by the repeller electrode, and may pass therethrough to be accelerated by a high voltage potential applied to the screen. The screen, the mask and the repeller electrode may all be light-transparent so that the image is visible from either side of the screen.

A further feature is the provision of a cathode-ray tube wherein a beam is directed into various positions of an elongated electron mirror and the mirror provides both an electromagnetic field for reversing the direction of beam travel and an electrostatic field for redirecting the beam at a selected angle with respect to a viewing screen which the beam is made to impinge.

Additional objects, features and the attending advantages thereof will be apparent upon consideration of the following description when taken in conjunction with the accompanying drawings, in which:

FIG. 2 is a sectional view along the line 2—2 of FIG. 1 and further shows circuitry for applying television signals to the display device;

FIGS. 3, 4 and 5 are schematic diagrams of circuits for providing deflection signals for the image display device;

FIG. 6 is an elevational view of a further form of the invention; and

FIG. 7 is a sectional view along the line 7—7 of FIG. 6.

Figure 1:
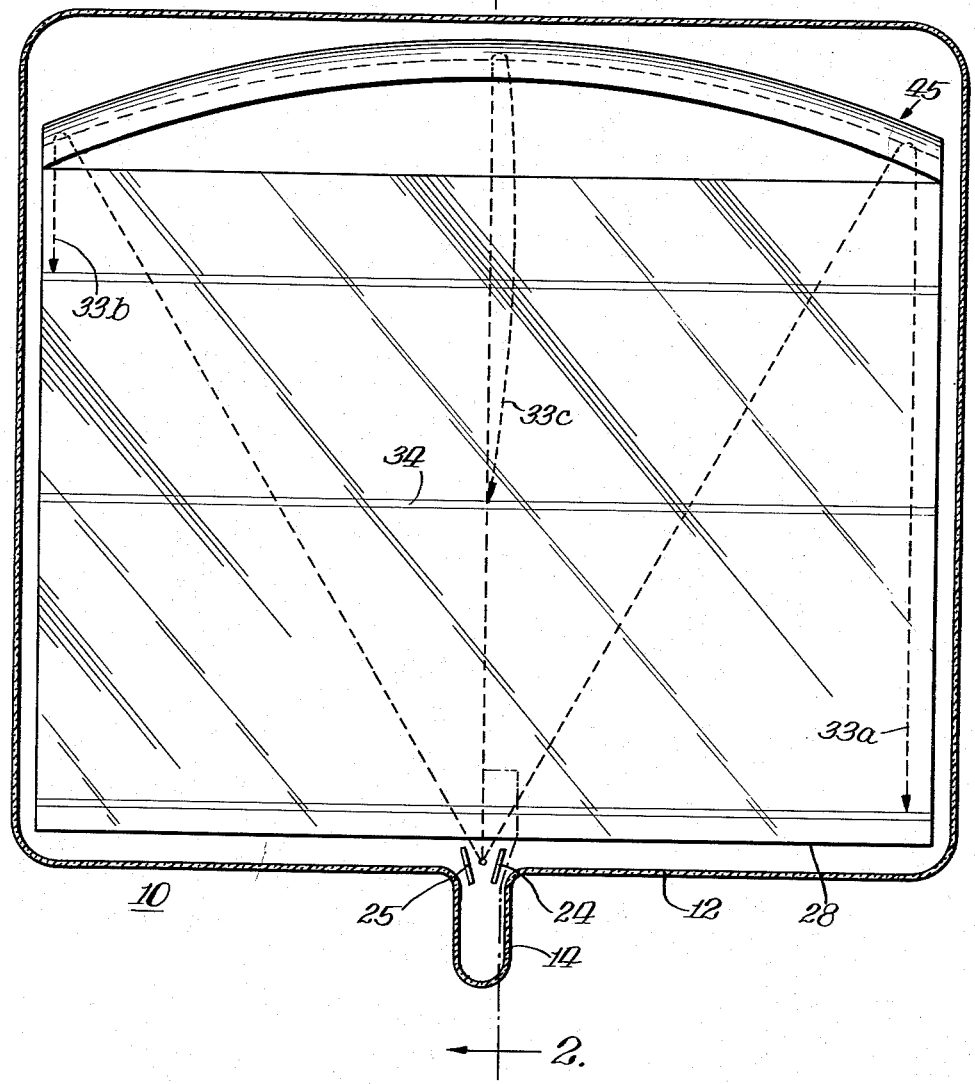
FIG. 1 is a front elevational view of the image display device of the present invention.

This invention provides a large screen electron image display device of relatively short and uniform depth or thickness. In the preferred form thereof, an electron beam source directs a beam from one edge of the viewing screen of the device through a drift space along the surface of the viewing screen and into an electron mirror, or inverter, adjacent the opposite edge of the screen. A repeller electrode is disposed in spaced relation from the opposite surface of the screen, and the screen has a coating on this surface to produce a visible image when impinged and scanned by an electron beam. The electron mirror redirects the beam into the space between the viewing screen and the repeller electrode, and a scanning potential applied to the repeller electrode causes the beam to be deflected toward, and scanned across, the screen. The application of an exponential scanning potential to the repeller electrode produces essentially linear sweep of the beam across the screen in a direction along the axis of the beam source and mirror. Sawtooth deflection signals applied to additional deflection apparatus, such as electrostatic deflection plates or a magnetic yoke disposed adjacent the beam source, may be employed to sweep the beam in a direction transverse to the axis of the beam source. The mirror may be formed so as to direct the beam thus deflected into paths parallel to the beam source-mirror axis thereby developing a linear trace from the repeller electrode scanning. The mirror may use electrostatic or electromagnetic fields or both.

The cathode ray image display device or tube 10 shown in FIGS. 1 and 2 includes a rectangular glass envelope 12 which may be sealed and evacuated as is customary in the electron tube art. The envelope has a uniform depth or thickness (FIG. 2) and a short neck portion 14 extending centrally from one edge thereof. The neck portion 14 includes an electron beam gun having a cathode 16, a control grid 18, a first anode 20 and a focusing element 22. Deflection plates 24 and 25 are provided in the neck adjacent the rectangular envelope.

A rectangular glass screen 28 is supported substantially in the center of the envelope 12 so as to define a beam drift space 31 between the front of the envelope and the front surface of the screen. The beam forming apparatus included in the neck portion 14 directs an electron beam through the drift space 31 and along a path 33 (FIG. 2) which is substantially parallel to the front of the envelope 12 and the screen 28. The drift space 31 is shielded on both sides by means of an electrically conductive coating 36, 37 having high light transmission properties and applied to the back surface of the front wall of envelope 12 and to the front surface of screen 28. Coating 36, 37 is maintained at the potential of the first anode 20 through contacts 40.

The electron beam is directed into a beam inverter or electron mirror 45 which is disposed along the upper edge of screen 28 and opposite the source of electrons in neck portion 14. The electro-static type of inverter or mirror 45 is constructed of two concentric cylindrical portions 47 and 48 which are arranged so that the beam is directed therebetween. As an illustrative example the inner portion 47 may be of half inch radius and the outer portion 48 may be of one inch radius. As shown in FIG. 1 the mirror is curved in a plane parallel to screen 28, that is, the central axis of the cylindrical portions of mirror 45 is curved. The radius of the curved axis is twice the distance between the center of beam deflection at plates 24, 25 and the mid point between the inner and outer portions of the mirror. Accordingly, as the electron beam strikes the mirror at different points through action of deflection circuit 49 supplying plates 24, 25, and as the beam is redirected by mirror 45, the beam will travel along paths parallel to the sides of screen 28 as shown in FIG. 1. That is, the beam will be deflected back toward its source in a plane parallel to the vertical axis of the neck section 14 and mirror 45 and may be horizontally scanned along a trace 34 (FIG. 1) by signals on plates 24, 25.

The beam is made to traverse through the mirror on the mid line between the concentric half cylinders by applying a potential slightly negative with respect to anode 20 and coating 37 to the outer portion 48 of mirror and by connecting the inner portion 47 of the electron mirror to essentially the anode potential. The beam will thus be directed into the scanning space 55, at an angle of approximately 155° from its entry path into mirror 45. This angle is provided for a reason to be stated hereinafter.

The scanning space 55 is bounded on the back side by a repeller electrode 57 which comprises a transparent conductive layer deposited on the inside of the back of envelope 12. Shield 58, adjacent mirror 45, confines the repeller field and prevents interference with action of the mirror. A platform 59 extends from the mirror to provide a space between the mirror 45 and the used portion of the screen 28. A scanning signal, or so called field sweep signal, may be applied to repeller 57 from deflection circuit 62. In the described form of the image display device, a potential of approximately —400 volts on electrode 57 causes the beam to traverse a path 33a wherein it is directed into the bottom portion of screen 28. Similarly at the negative peaks of the deflection signal, for example, peaks of —3200 volts, the beam is directed along a path 33b wherein it is deflected into the top portion of the screen 28. Extremely high voltages would be required to bring the beam in to the screen nearer mirror 45 and for this reason the platform 59 is provided to define a waste space which may be of the order of 10% or less of picture height. Obviously, the beam is deflected to intermediate positions, such as along path 33c, when the scanning signal from circuits 62 is at intermediate potential levels. To provide deflection from the top of the screen down, as is usual, a negative going signal of exponential waveform may be used.

It is desirable that the beam be elevated from the screen by a minimum amount to hold down the depth of the tube and so that the repeller voltage required to direct the beam on the screen will be low. However, in order to provide the desired spot characteristics, the beam must strike the mask at a substantial angle. It has been found that folding or reflecting the beam through an angle of 155° produces satisfactory results and causes the beam to strike the screen at an angle of 25°. This permits the beam to penetrate the mask 50 in satisfactory manner when such a mask is used for post acceleration purposes. For different constructions other angles of elevation of the beam may be preferred.

Mask 50, used to provide post deflection acceleration, may be composed of an insulating plate (glass) with electrically conductive material deposited on the surfaces thereof and having therein apertures 20 mils in diameter and spaced 30 mils on centers. The thickness of the mask may be of the order of 8 mils. Furthermore, since the beam will not be travelling a path perpendicular to the surface of the mask it is preferable to "tilt" the apertures at an angle of approximately 25° upwardly so that maximum electron beam transparency is obtained. The mask 50 is constructed to prevent emission of secondary electrons therefrom onto the screen 28 in accordance with the teachings of my copending application entitled Cathode Ray Tube and filed August 15, 1955, under Serial No. 528,404, now abandoned. The mask has a coating 50a facing repeller electrode 57 and established at the potential of electron gun anode 20. Coating 50b faces screen 28 and is at a slightly lower (more negative) potential than coating 50a. Therefore, the electron beam traverses a negative going potential gradient as it passes through mask 50, and this gradient forms a barrier to the passage of secondary electrons from the shield or mask 50 to the viewing screen 28.

As previously mentioned, the back side of screen 28 is provided with a phosphor coating 64 which is maintained at a potential of 20,000 volts so that the beam is accelerated to full velocity after leaving mask 50. This post acceleration of the beam provides a bright image display and permits deflection and control of the beam at low potential so that deflection is easily accomplished. The potential gradient between the mask and the screen further provides a certain focusing of the beam as it impinges the light emissive coating 64. In a specific embodiment of the invention the spacing between mask 50 and screen 28 was ¼ inch and the spacing between mask 50 and electrode 57 was 2½ inches. It is to be pointed out however, that the invention may be practiced without the use of post acceleration deflection and in such case the mask 50 will not be required.

The image developed on screen 28, as the beam is scanned vertically by repeller electrode 57 and horizontally by plates 24, 25, and as it is modulated by the signal applied to grid 18, may be viewed from the front of the tube 10 and may also be viewed from the rear if the mask 50 is not used or if it is made of a transparent material. Layer 36, 37 may be composed of conductive material having high transparency, such as presently available materials which provide 72% light transmission for the two layers, to provide a bright image viewed from the front through these layers. When mask 50 is not used a very bright image is provided from the backside.

One specific use of the invention will be described in which tube 10 is coupled to a television receiver 70 (FIG. 2) which applies television beam modulating signals through capacitor 71 to control grid 18. The usual line synchronizing signals, customarily at a frequency of 15.75 kilocycles and derived from the synchronizing pulses of a received signal, are applied by way of line 75 to the deflection circuit 49. Circuit 49 develops sawtooth voltage wave forms at the line frequency and applies signals to the deflection plates 24, 25. Similarly the field deflection circuit 62 is coupled by way of line 77 to the receiver 70 in order to apply field synchronizing signals at 60 cycles per second thereto. This circuit is connected to the repeller electrode 57 and provides signals having an exponentially decreasing wave form.

Bias potentials for the electrodes of the tube 10 are available from various points of a biasing network comprised of series connected resistors 80, 81, and 82 coupled between ground and a source of negative potential of the order of 2.2 kilovolts. The cathode 16 is connected to the junction of resistors 81, 82 and is established at substantially −2 kilovolts. The first anode 20 is connected to ground (zero potential) and the focussing element 22 is connected to a tap point of resistor 81 so as to be at a potential slightly above (more positive than) the cathode. The junction of resistors 80, 81 is connected to the coating 50b of mask electrode 50 so as to be established at a potential intermediate those of the first anode 20 and the cathode 16. Control grid 18 is connected through signal isolation resistor 87 to a tap point of resistor 82, thereby biasing this grid negatively with respect to the cathode 16. Resistor 89 is coupled between the cathode 16 and ground and a tap point of this resistor is connected through resistor 90 to the outer electrode 43 of the electron mirror 45. The final anode electrode or coating 64 is connected to a source of high voltage direct current potential, here shown as 20 kilovolts.

As previously stated, deflection plates 24, 25, will direct the beam into various points of the electron mirror 45. Suitable signals to accomplish this deflection may be formed by the deflection amplifier shown in FIG. 3. This circuit corresponds to deflection circuit 49 (FIG. 2). For television applications of the image display device, a sawtooth signal of 15.75 kc. is impressed on the input line 75 to cause alternate conduction of vacuum tubes 106, 107 in a manner understood in the art. The output of this amplifier is applied to plates 24, 25 in the form of a linear sawtooth signal at 800 volts peak to peak on each of the plates. The particular value of the necessary deflection signal will vary in accordance with different tube constructions and associated circuitry but is given herein by way of example for a tube in which screen 28 is 16 inches by 21 inches in size. It is to be noted again that regardless of the angle through which the beam is deflected, it will emerge from mirror 45 travelling in a direction parallel to the vertical sides of screen 28. This is due to the mirror being formed into an arc of a circle.

A circuit to develop the exponential scanning signal for electrode 57 is shown in FIG. 4. This circuit corresponds to circuit 62 (FIG. 2). Pulses at 60 cycles per second are applied from the television receiver 70 by way of line 77 to the discharge tube 120. The discharge tube discharges condenser 101 so that the voltage thereacross is reduced to zero and then builds up exponentially. This in effect produces a maximum negative voltage which causes the beam to strike the top of the screen with the negative voltage decreasing so that the beam strikes the screen farther down.

In some instances it may be desired to scan the beam so that lines start at a point remote from the mirror and move closer to the mirror as scanning proceeds. A circuit for providing such operation is shown in FIG. 5. Again pulses at 60 cycles per second are applied from the television receiver are applied through line 77 to the system which includes a clamping tube 130. Through proper selection of the constants in this circuit a parabolic wave form is developed across capacitor 132 and this signal is applied to the amplifier tube 136 where it is inverted and amplified to the desired hyperbolic signal of 2800 volts peak to peak. The circuitry in which tube 136 is connected may be termed a linearized, inverse feedback amplifier and through variation of the feedback resistor 140, this circuit will provide the desired hyperbolic signals having the proper amplitude.

FIGS. 6 and 7 show a modified form of the invention in which line scanning of the beam is produced by electromagnetic means and field, or vertical scanning, of the beam is produced by an electrostatic field. The electron mirror uses combined electrostatic and electromagnetic fields. In FIGS. 6 and 7, elements corresponding to those of the previously described embodiment are given the same reference characters. As may be seen in the circuitry included in the sectional view of FIG. 7, an input signal is impressed on terminals 150 in order to control the beam intensity in accordance therewith. The beam is then accelerated by anode 20 which is at full positive potential established at terminal 152. The beam is then focused by element 22 which is maintained at a potential applied to terminal 154 and directed into the drift space 31 bounded by coatings 36, 37 which are maintained at the potential of the anode 20. Line deflection of the beam, in a plane parallel to the view of FIG. 6, is produced by applying scanning signals to terminals 156 which are connected to a magnetic deflection yoke 160 supported on the neck portion 14 where the beam emerges from anode 20.

As in the previous embodiment the beam is directed along a path 33 in the scanning space 31 and is introduced between the pole pieces 162, 163 of the novel type of electromagnetic electron mirror 165. These pole pieces are insulated from one another and spaced across the depth of the tube so as to receive the beam therebetween and redirect it into scanning space 55. From a flat side of the tube the pole pieces 162, 163 have edges facing the beam source (in neck portion 14) which are parabolic in configuration. As in the previously described embodiment this provides a redirection of the beam in a vertical direction, that is, parallel to the vertical sides of the screen 28 during line scanning thereof by yoke 160.

Portions of the pole pieces 162, 163 extend along the upper side of the envelope 12 and are in closely spaced relation to the respective poles of core 170 of minor magnet 172, which is supported on the outside of envelope 12. This magnet includes a winding 174 which is energized by a direct current potential applied to terminals 175. Coil winding 174 is wound on core 170 in a direction across the width of the tube as viewed in FIG. 6 so that a magnetic reflecting field is produced between pole pieces 162, 163 for folding or reversing the direction of beam travel. An electrostatic field is also produced between pole pieces 162, 163 by applying a direct current potential thereacross from terminals 178. This electrostatic field is adjusted so as to elevate the beam by approximately 25° with respect to its direction of entry into the electron beam mirror 165. The potential of pole pieces 162, 163 may be balanced with respect to the potential of anode 20 by connecting this anode to a center tap of resistor 180 connected between terminals 178, but this is not essential.

A suitable field scanning signal is applied to repeller electrode 57 from terminal 182 and the final anode electrode, or coating 64, is maintained at the high voltage potential applied to terminal 185. In this way the beam is scanned in a vertical direction across screen 28, as in the previously described embodiment.

As a further modification of the device of FIGS. 6 and 7, it is possible to provide the beam sensitive screen or target in place of repeller 57 and to obtain the necessary vertical scanning of the beam by applying a variable beam elevating potential to terminals 178. The magnetic field of the mirror then may reverse the direction of travel of the beam and the electrostatic field may direct the beam toward various positions of the tube face which functions as an ultor or screen. Such a construction, of course, still retains the advantages of horizontally scanning the beam across the elongated mirror in a plane essentially parallel to the screen so that the tube has a very short depth.

The invention therefore provides an image display device which is of extremely short depth. By folding over the beam through the electron mirror, and by constructing the mirror as described, automatic straightening of the lines takes place to overcome the keystone effect resulting in many such tube constructions. The extra beam length provided by the fold or reflection makes it possible to use a relatively narrow deflection angle and still scan a very large screen. By assigning to the repeller the slow scanning action, the sweep power supply to the repeller is kept low in spite of the very high sweep voltages involved. By spacing the active portion of the screen somewhat from the mirror, a lesser repeller voltage is needed and this further facilitates shielding of the repeller voltages from the mirror voltages. Although an elevation angle of 25° has been mentioned and this has been found to provide satisfactory characteristics, it is to be pointed out that a smaller angle may be used when post acceleration deflection is not used and this would permit the use of a tube structure which is still thinner. When post acceleration is used and a barrier mask is required, it may be desired to provide a high elevation so that greater penetration of the mask takes place in the event that the tube depth is not unduly critical. In the construction as shown a tube depth of 4" is possible.

The construction of the tube of the image display device is not unduly critical and the cost thereof would not be substantially greater than that of other tubes providing the same size screen. Operation of the tube does not pose a difficult problem since the potentials required, including the scanning potentials, may be easily provided. Accordingly, the display device is suitable for use in many applications and may be operated by simple circuits which are not difficult to construct or adjust.

I claim:

1. A cathode ray image display device including in combination an evacuated transparent enclosure, a viewing screen having first and second surfaces, an anode electrode on said first surface, a transparent conductive coating on said second surface and on the surface of said enclosure facing said second surface to form a drift space, an electron source supported at one end of said drift space in a position outwardly spaced from said second surface of said viewing screen and adapted to direct an electron beam along different paths in said drift space, an elongated electron beam mirror disposed at the other end of said drift space and adapted to receive said electron beam from said source, a transparent repeller electrode on the surface of said enclosure facing said anode electrode to define a scanning space with said anode electrode, said electron beam mirror providing a composite magnetic and electrostatic field to direct said electron beam into said scanning space, and means for applying a scanning signal to said repeller electrode so that said electron beam is directed thereby into said screen at various positions to scan said viewing screen and produce an image thereon which may be viewed from said first and second surfaces of said screen.

2. A cathode ray image display device housed in an evacuated enclosure including in combination, transparent screen having first and second surfaces, an anode electrode on said second surface of said screen, a source of electrons spaced from said first surface of said viewing screen and adapted to direct an electron beam along a path spaced from said first surface, an electron beam mirror spaced from the edge of said viewing screen to receive said electron beam from said source, a repeller electrode disposed in spaced relation from said second surface of said viewing screen, a mask electrode disposed intermediate said repeller electrode and said viewing screen, said mask electrode including apertures therein to present high transparency to an electron beam, said electron beam mirror being arranged to direct said electron beam between said mask electrode and said repeller electrode, means for energizing said anode electrode to a beam attracting potential with respect to said mask electrode, means for energizing said mask electrode for reducing emission of secondary electrons therefrom, and means for applying a scanning signal to said repeller electrode so that said electron beam is directed toward said mask electrode to pass therethrough and impinge said viewing screen.

3. In a cathode ray image display device the combination of a light-transparent viewing screen having anode means on a surface thereof, a repeller electrode disposed in spaced relation from said anode means, an apertured mask electrode disposed intermediate said repeller electrode and said viewing screen, said apertures in said mask electrode being formed at a given angle with respect to the surface thereof to present high transparency to an electron beam approaching at said angle, said mask electrode further being energized to present a negative potential gradient to a beam passing therethrough to prevent secondary emission therefrom, means for supplying and directing an electron beam of given potential between said mask electrode and said repeller electrode, means for supplying a potential higher than said given potential to said anode means, and means for applying a scanning signal to said repeller electrode so that said beam is directed through said mask electrode at said given angle and at various positions thereof to be scanned across said anode means for creating an image display.

4. A cathode ray image display device including in combination an evacuated transparent enclosure, a viewing screen disposed within said enclosure and having first and second surfaces defining a drift space between said first surface and said enclosure and a scanning space between said second surface and said enclosure, an electron beam source outwardly spaced from said first surface of said viewing screen and adapted to introduce an electron beam into said drift space, deflection means supported adjacent said beam source to deflect said beam along different paths in said drift space, an electron beam mirror supported along one edge of said viewing screen and in alignment with said different paths of said electron beam, said electron beam mirror comprising first and second pole pieces adapted to receive said beam therebetween, means for establishing a combined electrostatic field and an electromagnetic field between said first and second pole pieces for redirecting said electron beam into said scanning space, a repeller electrode disposed outwardly from said second surface of said viewing screen, and means for applying a scanning signal to said repeller electrode so that said electron beam is deflected toward said second surface of said viewing screen and scanned thereacross to produce an image display, said first and second pole pieces of said electron beam mirror having a curved configuration in the direction facing said different paths of said electron beam so that said beam is directed along parallel paths in said scanning space when deflected by said deflection means thereby promoting rectilinear scanning of said beam across said screen by said repeller electrode.

5. A cathode ray tube including in combination an evacuated enclosure; beam target means including a screen supported within said enclosure; said screen including a beam energizable surface and at least one edge portion; an elongated electron beam mirror including spaced electrodes disposed along, and outwardly from, said edge portion; an electron beam source disposed outwardly from said beam target means and positioned to direct an electron beam along a path substantially parallel to said energizable surface of said screen and into said beam mirror; scanning means adjacent said beam source for deflecting said beam into different positions of said elongated beam mirror; means including magnetic means coupled to said beam mirror for producing combined electrostatic and electromagnetic fields between said spaced electrodes for redirecting said electron beam at an acute angle; and further deflecting means for directing said electron beam into said screen of said beam target means.

6. A cathode ray tube including in combination an evacuated enclosure; beam target means including a screen supported within said enclosure; said screen including a beam energizable surface and at least one edge portion; an elongated electron beam mirror including spaced electrodes disposed along, and outwardly from, said edge portion; an electron beam source disposed outwardly from said beam target means and positioned to direct an electron beam along a path substantially parallel to said energizable surface of said screen and into said beam mirror; scanning means adjacent said beam source for deflecting said beam into different positions of said elongated beam mirror; and means energizing said beam mirror with a variable potential and magnetic means energized by a given current for producing combined electrostatic and electromagnetic fields between said spaced electrodes for redirecting said electron beam into said beam target means at various angles.

7. A cathode ray image display device including in combination an evacuated transparent enclosure, means dividing said enclosure into drift and scanning spaces and including screen means in said scanning space, an electron beam source disposed in said drift space, an elongated beam mirror disposed in said drift space and including spaced portions adapted to receive the beam therebetween, field producing means for scanning the beam in one direction across said electron beam mirror, said electron beam mirror including means for producing combined electrostatic and magnetic fields between said spaced portions thereof for directing the beam into the scanning space, and means for directing the beam onto said screen at an acute angle therewith.

References Cited in the file of this patent
UNITED STATES PATENTS

| | | |
|---|---|---|
| 2,332,876 | Uhlmann | Oct. 26, 1943 |
| 2,449,558 | Lanier | Sept. 21, 1948 |
| 2,464,562 | Diemer | Mar. 15, 1949 |
| 2,728,025 | Weimer | Dec. 20, 1955 |
| 2,760,096 | Longini | Aug. 21, 1956 |
| 2,777,084 | Lafferty | Jan. 8, 1957 |
| 2,795,729 | Gabor | June 11, 1957 |
| 2,795,731 | Aiken | June 11, 1957 |
| 2,809,324 | Shanafelt | Oct. 8, 1957 |
| 2,850,669 | Geer | Sept. 2, 1958 |